US012682231B2

(12) United States Patent　　　(10) Patent No.:　US 12,682,231 B2
Marinescu　　　　　　　　　　　　(45) Date of Patent:　　　Jul. 14, 2026

(54) REASONING WITH REAL-VALUED FIRST ORDER LOGIC AND PROBABILITY INTERVALS

(71) Applicant: INTERNATIONAL BUSINESS MACHINES CORPORATION, Armonk, NY (US)

(72) Inventor: Radu Marinescu, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 989 days.

(21) Appl. No.: 17/806,019

(22) Filed: Jun. 8, 2022

(65) Prior Publication Data

US 2023/0401437 A1　　Dec. 14, 2023

(51) Int. Cl.
G06N 3/08　　　(2023.01)
G06N 3/042　　（2023.01)
G06N 5/02　　　(2023.01)
G06N 7/01　　　(2023.01)

(52) U.S. Cl.
CPC ................ G06N 3/08 (2013.01); G06N 7/01 (2023.01)

(58) Field of Classification Search
CPC .. G06N 3/08; G06N 7/01; G06N 5/02; G06N 3/042
See application file for complete search history.

(56) References Cited

U.S. PATENT DOCUMENTS

| | | | |
|---|---|---|---|
| 5,750,946 | A | 5/1998 | Thangavelu |
| 6,374,197 | B1 | 4/2002 | Ganesh et al. |
| 2007/0050187 | A1 | 3/2007 | Cox |
| 2017/0109641 | A1 | 4/2017 | Hiroki et al. |

FOREIGN PATENT DOCUMENTS

| | | |
|---|---|---|
| CN | 104299162 B | 7/2017 |
| CN | 105048451 B | 4/2018 |
| CN | 107563857 B | 10/2020 |
| WO | 2010109035 A3 | 11/2010 |

OTHER PUBLICATIONS

F. G. Cozman, "Credal networks" Artificial Intelligence, 120:199-233, Feb. 9, 2000 (Year: 2000).*
Giuseppe Marra et al., "Lyrics: a General Interface Layer to Integrate Logic Inference and Deep Learning", arXiv:1903.07534v2, Sep. 12, 2019. (Year: 2019).*

(Continued)

*Primary Examiner* — Jennifer N Welch
*Assistant Examiner* — Jake Timothy Breen
(74) *Attorney, Agent, or Firm* — Rakesh Roy

(57)　　　　　　　ABSTRACT

Embodiments are provided for providing enhanced reasoning in a computing system by a processor. All first-order logic formulas may be converted into real-valued logic formulas. A probabilistic inference is executed using the real-valued logic formulas and one or more probability intervals associated with an atomic formulae in a knowledge base to provide an interval conditional probability indicating that a first predicate condition is true based one or more alternative predicates being true.

20 Claims, 9 Drawing Sheets

(56)     References Cited

OTHER PUBLICATIONS

Ryan Riegal et al., "Logical Neural Networks", arXiv:2006.13155, Jun. 23, 2020. (Year: 2020).*

Ide, Jaime Shinsuke, and Fabio Gagliardi Cozman, "IPE and L2U: Approximate algorithms for credal networks", EPUSP, 2006. (Year: 2006).*

Ide, Jaime Shinsuke, and Fabio Gagliardi Cozman. "Approximate algorithms for credal networks with binary variables." International Journal of Approximate Reasoning 48.1 (2008): 275-296. (Year: 2008).*

\* cited by examiner

400

410    12

INTELLIGENT REASONING SERVICE

420

PROCESSOR

430

MEMORY

440

REASONING COMPONENT

450

PROBABILISTIC INFERENCE COMPONENT

460

QUERY COMPONENT

470

MACHINE LEARNING MODEL COMPONENT

700

START ~702

CONVERT ALL FIRST-ORDER LOGIC FORMULAS INTO
REAL-VALUED LOGIC FORMULAS ~704

REASON WITH THE REAL-VALUED LOGIC FORMULAS AND ONE OR
MORE PROBABILITY INTERVALS ASSOCIATED WITH AN ATOMIC
FORMULAE IN A KNOWLEDGE BASE TO PROVIDE AN INTERVAL
CONDITIONAL PROBABILITY ~706

END ~708

REASONING WITH REAL-VALUED FIRST ORDER LOGIC AND PROBABILITY INTERVALS

BACKGROUND

The present invention relates in general to computing systems, and more particularly, to various embodiments for providing automatic reasoning with real-valued first order logic and probability intervals using a computing processor.

SUMMARY

According to an embodiment of the present invention, a method for providing automatic reasoning with real-valued first order logic and probability intervals in a computing environment, by one or more processors, is depicted. All first-order logic formulas may be converted into real-valued logic formulas. The real-valued logic formulas and one or more probability intervals associated with an atomic formula in a knowledge base may be reasoned to provide an interval conditional probability.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for reasoning with real-valued first order logic and probability intervals are provided.

DETAILED DESCRIPTION OF THE DRAWINGS

Figure 1:
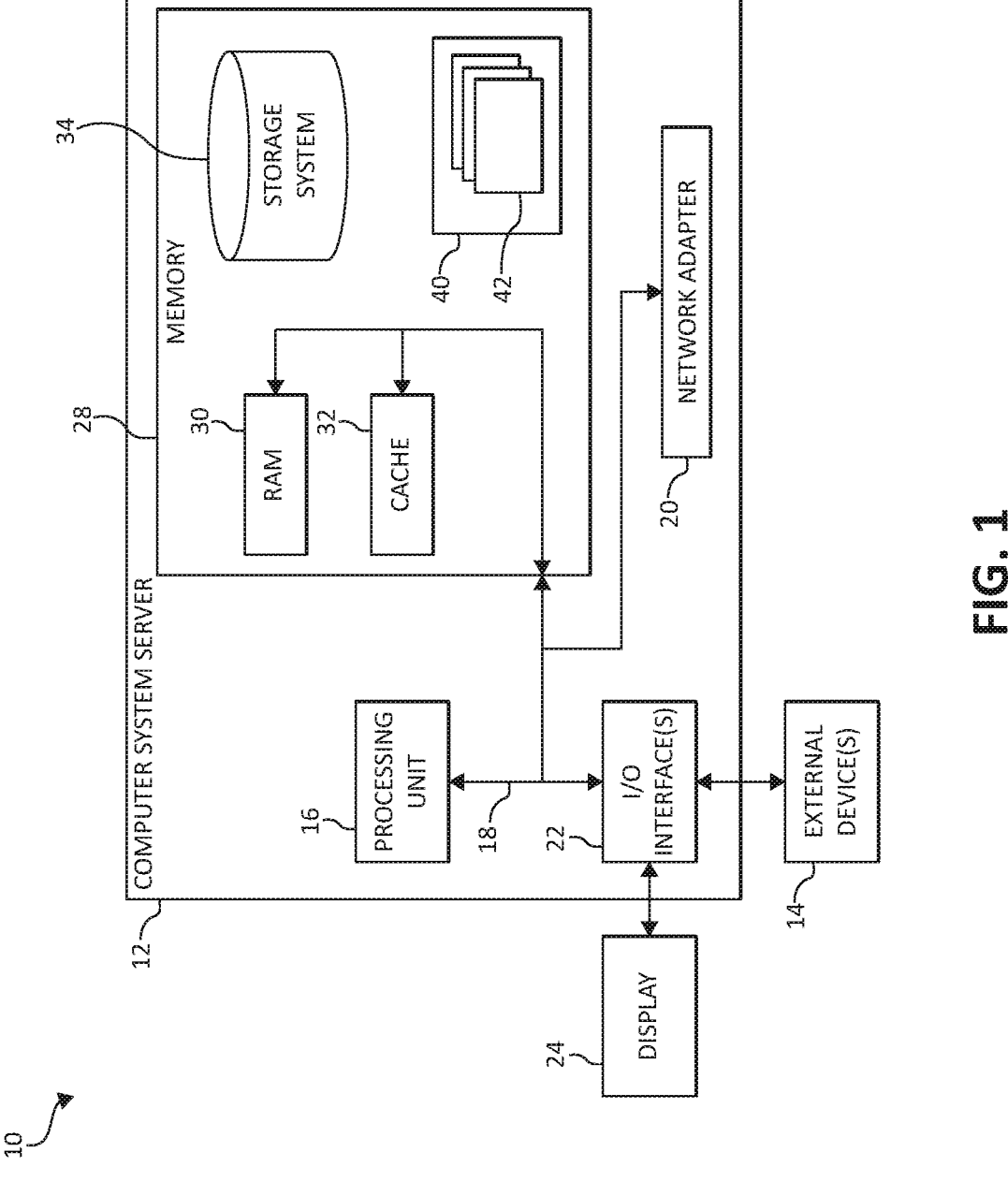
FIG. 1 is a block diagram depicting an exemplary cloud computing node according to an embodiment of the present invention.

The present invention relates generally to the field of artificial intelligence ("AI") such as, for example, machine learning and/or deep learning. Many computing systems may include Artificial neural networks ("ANNs") to perform computational tasks in a manner inspired by biological architectures of the nervous system. These networks are based on a principle of biological systems whereby neurons are interconnected via synapses which relay signals between the neurons. A biological neuron processes its input signals and generates output signals which are transmitted to other neurons via respective synapses. Artificial neural networks are based on a logical construction in which a succession of layers of neurons are interposed with layers of synapses, with each synapse interconnecting a respective pair of neurons in successive neuron layers. Signals relayed via synapses are weighted according to respective synaptic weights stored for the synapses. Weighted signals can thus be propagated over successive layers of the network from an input to an output neuron layer.

To learn powerful representations, neural networks may require a large amount of training data. However, for many real-world problems, it is not always possible to obtain sufficiently large, cleanly labeled datasets. Instead, a set of labeled training data that is limited in size and possibly with corrupted labels is used as training data, which may negatively affect a machine learning model performance. Although acquiring a large dataset is not difficult, accurate labeling of the data is expensive and an error-prone task and may require involvement of human interaction.

Moreover, automated reasoning is a critical field in Artificial Intelligence and advances in neurosymbolic reasoning is a core strategy for many industries. In many practical situations, acquiring knowledge is a noisy process (e.g., extracting logical representations from text). Reasoning with this kind of knowledge may therefore be prone to errors. Thus, a need exists for using real-valued logic rather than classical logic, which is known to be quite brittle.

Accordingly, aspects of this disclosure provide for automatic reasoning with real-valued first order logic (e.g., executing a probabilistic inference operation using real-valued first order logic) and probability intervals in a computing environment, by one or more processors. All first-order logic formulas may be converted into real-valued logic formulas. The real-valued logic formulas and one or more probability intervals associated with an atomic formula in a knowledge base may be reasoned to provide an interval conditional probability.

In some implementations, aspects of this disclosure provide for executing machine learning logic to convert all first-order logic formulas into real-valued logic formulas, wherein the real-valued logic formulas are input as training data into a logical neural network ("LNN"); and generating the LNN by using the training data to execute a probabilistic inference using the real-valued logic formulas and one or more probability intervals associated with an atomic formulae in a knowledge base to provide an interval conditional probability indicating that a first predicate condition is true based one or more alternative predicates being true.

In some implementations, aspects of this disclosure represent a truth value of each of the real-valued logic formulas as a zero or a one value, receive a set of the first-order logic formulas, a set of intervals representing upper and lower bounds on one or more truth values of a set of ground predicates from the first-order logic formulas, and set upper and lower bounds on one or more truth values of the real-valued logic formulas in a knowledge base.

In some implementations, aspects of this disclosure determine a probability of a ground predicate being true based on an alternative ground predicate being true.

In some implementations, aspects of this disclosure ground a first-order logic based on a knowledge domain of a plurality of variables; construct a Logical Neural Network (LNN) representation of the grounded first-order logic; and construct a credal network (CN) associated with the LNN.

In some implementations, aspects of this disclosure apply a probabilistic inference to determine a set of solutions to one or more queries.

In some implementations, as used herein, "reasoning" may be used/interpreted as solving a probabilistic inference task such as, for example, computing the probability that person C has cancer given that it is observed that person A is a smoker. The observations could actually be more than one predicate, e.g., compute the probability that person C has cancer given that A smokes and A is friends with, which may be written formally as $P(Ca(C)|Sm(A), Fr(A, C))$, where C a (C), Sm(A), Fr(A, C) are the grounded predicates in the example.

In order to be able to solve the probabilistic inference task, aspects of the disclosure converts input logic into a graphical model that can be used to compute a desired or intended probability. For example, the following operational steps may be implemented, as depicted below in FIGS. 6A-6C.

In step 1, the knowledge may be formalized into first-order logic statements. It may be assumed that the logical connectors are real-valued logical connectors (implies, and, or, not). The conversion is trivial, namely classical logical connectors may be treated as if they were real-valued logical connectors.

In step 2), the first-order logic may be grounded assuming finite domains of values for the variables (in the example variables x and y take values {A, B, C}). This yields the grounded predicates (see FIGS. 6A-6C).

In step 3), for some grounded predicates, the bounds on their truth values may be known. It should be noted that in real-valued logic, the truth value of a formula is a real number between 0 and 1 (as opposed to either 0 or 1 as in classical logic). For all the other predicates, we assume default truth values given but the interval [0,1].

Figure 6A:
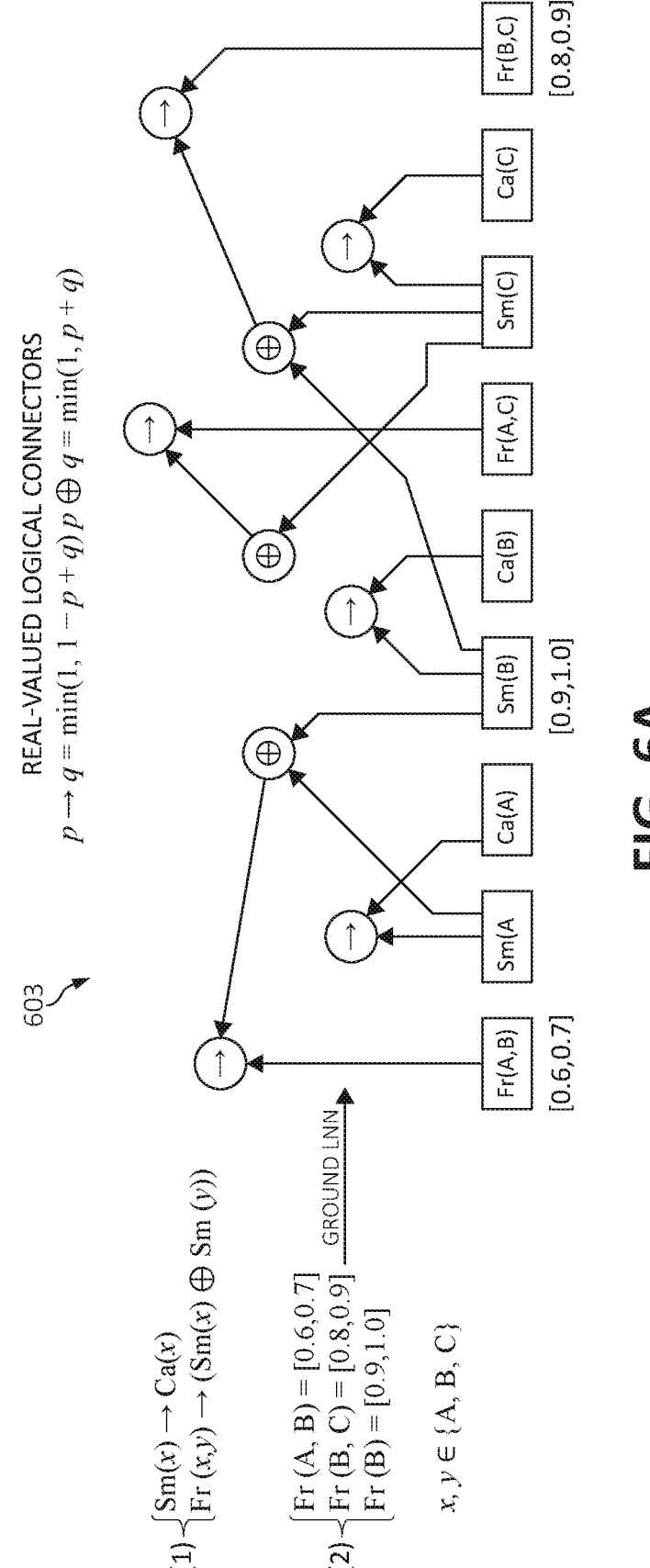
FIG. 6A is a diagram depicting a logical neural network (LNN) associated with the grounded formulas in a computing environment, by a processor, in which aspects of the present invention may be realized.
Figure 6B:
FIG. 6B is a diagram depicting a logical neural network (LNN) associated with propositional formulas in a computing environment, by a processor, in which aspects of the present invention may be realized.
Figure 6B:
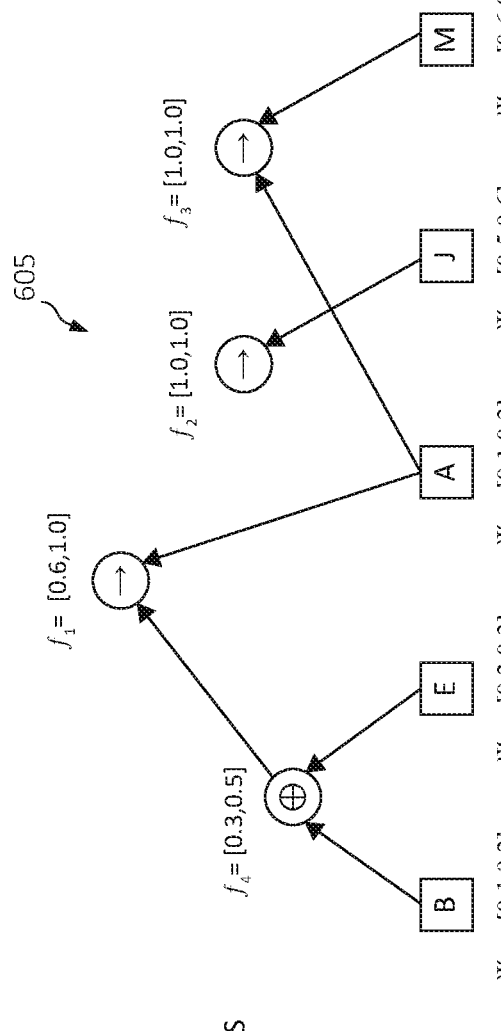

In step 4), a LNN ("logical neural network") representation of the grounded logic formulas (e.g., a graph) may be created. The type of real-valued logic used (in our example we use Lukasiewicz logic) dictates how the truth values of the logical connectors are computed. The graphs in FIGS. 6A-6B show how the truth values are computed for all nodes in the LNN.

In step 5), a credal network representation may be created of the LNN. The credal network representation is a directed acyclic graph having exactly the same structure as the LNN and the only difference is that each node is associate with a credal set. These may be tables and represent the probability that a node is true given the truth values of its parents e.g., $P(f3|A, M)$ gives the probability that f3 is true given all possible combinations of truth values of its parents A and M.

In step 6), the obtained credal network can be used to answer any query of the form such as, previously described in the beginning, namely compute the probability that some grounded predicate is true given that we observe one or more predicates (different from the former) are true (or false). This inference process is not trivial. In one possible embodiment, we say that we can use state of the art probabilistic inference algorithms for credal networks to solve the task. One such algorithm is a Loopy 2U (L2U), which is an iterative scheme that passes messages between the nodes in the credal network until some convergence criterion is met (or until a given time limit is reached).

In addition, aspects of this disclosure bound the uncertainty in a principled manner using probability intervals (e.g., uncertainty is represented using probability intervals) and therefore allow for more flexibility in the reasoning process. That is, aspects of this disclosure determine upper and lower bounds on the truth values of the predicates instead of point estimates.

In some implementations, aspects of this disclosure may convert all first-order logic formulas into real-valued logic formulas; and execute a probabilistic inference using the real-valued logic formulas and one or more probability intervals associated with an atomic formulae in a knowledge base to provide an interval conditional probability indicating that a first predicate condition is true based one or more alternative predicates being true In some implementations, various embodiments are provided herein that convert all first-order logic formulae into real-valued logic formulae (e.g., Lukasiewicz logic). This allows a truth value of a formulae to be a real number between 0 and 1 instead of just either 0 (false) or 1 (true). In addition, to account for uncertainty in the estimates of the truth values, we set upper and lower bounds on the truth values of the formulae in the knowledge base. Subsequently, aspects of this disclosure may answer any query of the form $Pr(f(x)|g(y))$ i.e., what is the probability of grounded predicate f(x) being true given that another ground predicate g(y) is true. Thus, a variety of queries may be solved and then translated into probabilistic reasoning over an equivalent credal network.

It should be noted as described herein, the term "intelligent" (or "cognitive/cognition") may be relating to, being, or involving conscious intellectual activity such as, for example, thinking, reasoning, or remembering, that may be performed using a machine learning. In an additional aspect, cognitive or "intelligent" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "intelligent" or "machine learning operation" may refer to identifying patterns of behavior, leading to a "learning" of one or more events, operations, or processes. Thus, a machine learning model (e.g., an artificial intelligent model) may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term intelligent may refer to an intelligent system. The intelligent system may be a specialized computer system, or set of computer systems, configured with hardware and/or software logic (in combination with hardware logic upon which the software executes) to emulate human cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. An intelligent system may perform one or more computer-implemented intelligent operations that approximate a human thought process while enabling a user or a computing system to interact in a more natural manner. An intelligent system may use AI logic, such as NLP based logic, for example, and machine learning logic, which may be provided as specialized hardware, software executed on hardware, or any combination of specialized hardware and software executed on hardware. The logic of the intelligent system may implement the intelligent operation(s), examples of which include, but are not limited to, question answering, identification of related concepts within different portions of content in a corpus, and intelligent search algorithms, such as Internet web page searches.

In general, such intelligent systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and intelligence; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human intelligence based on experiences.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
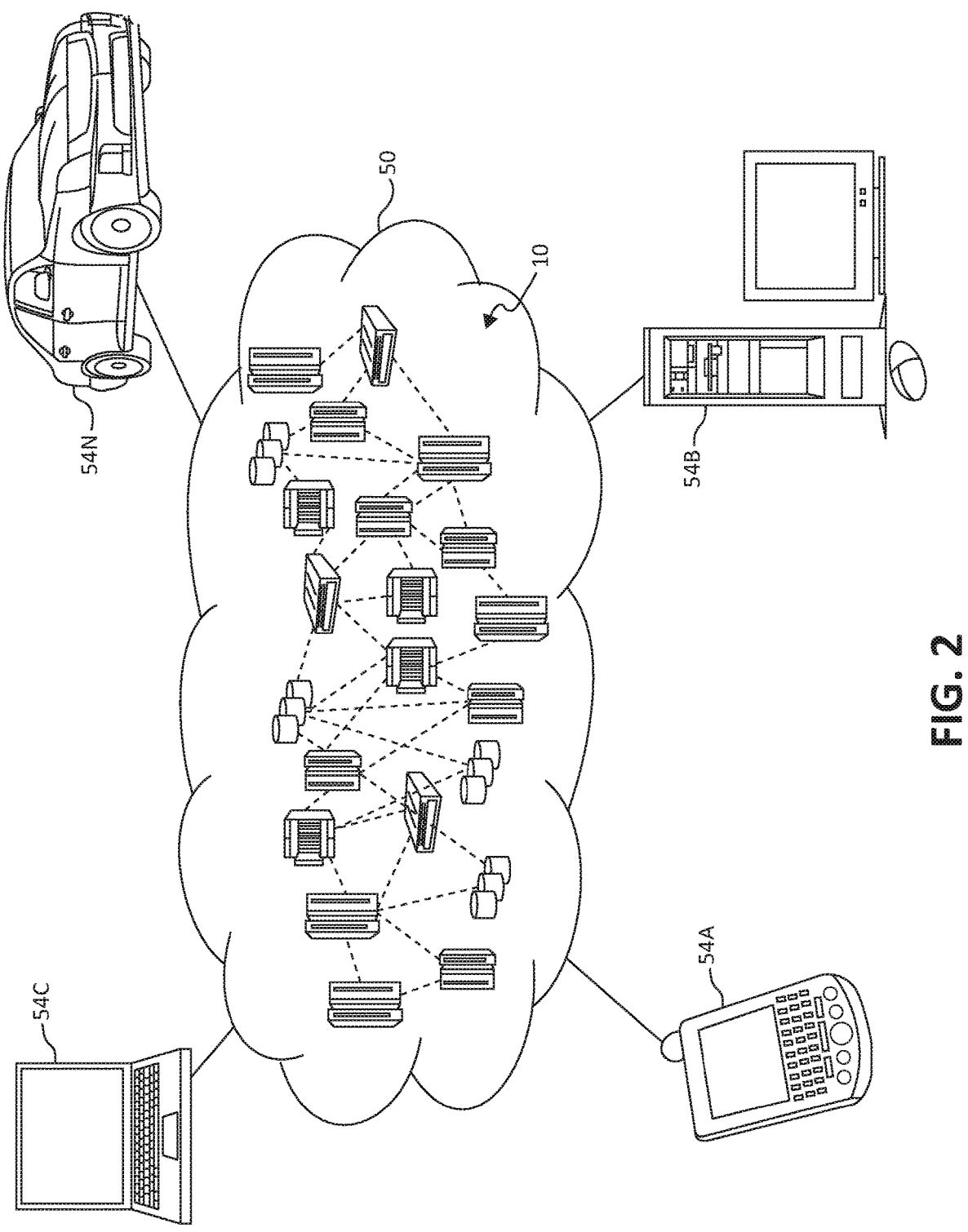
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
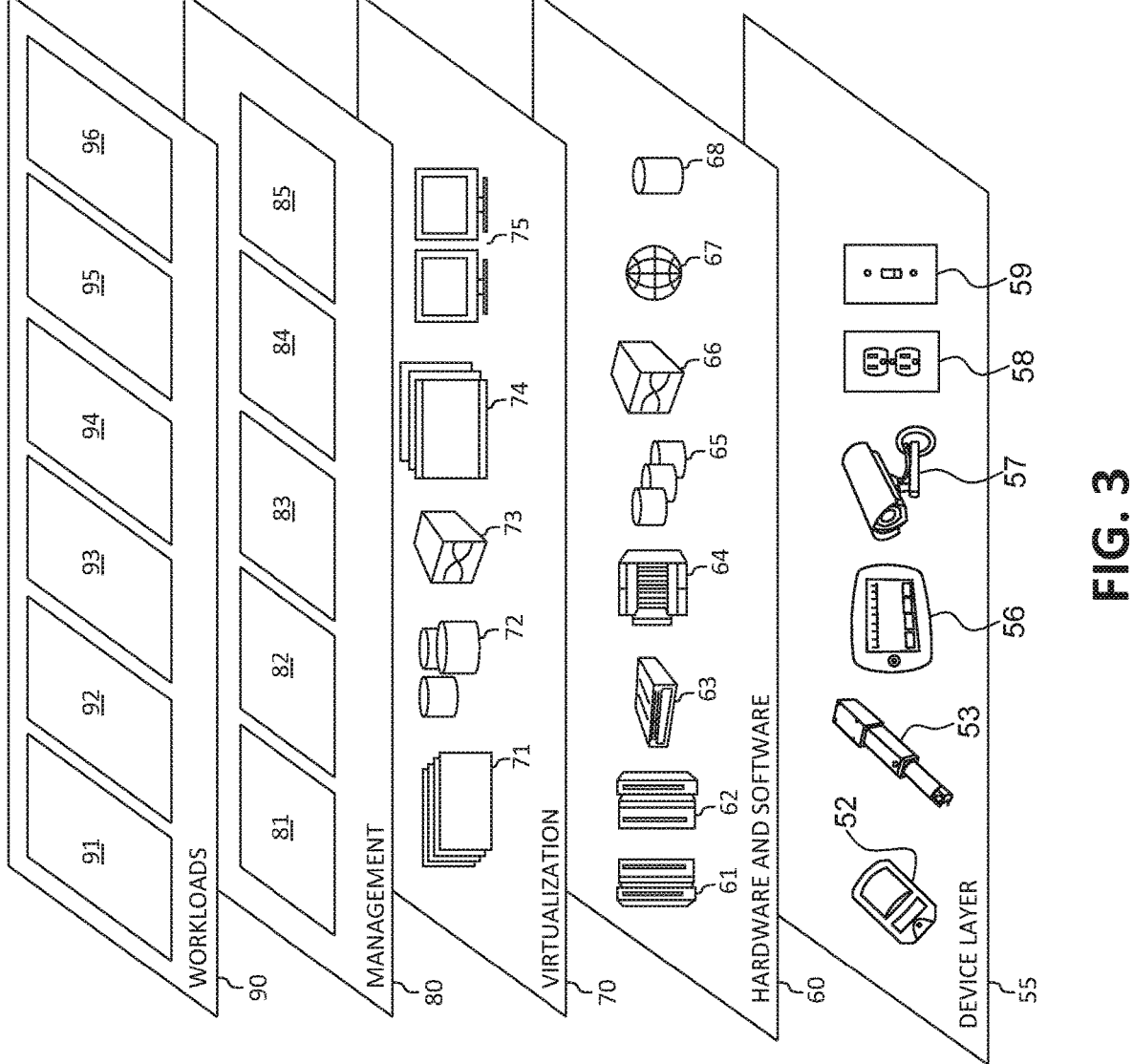
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for automatic reasoning with real-valued first order logic (e.g., executing a probabilistic inference operation using real-valued first order logic) and probability intervals in a computing environment (e.g., in a neural network architecture). In addition, workloads and functions 96 for automatic reasoning with real-valued first order logic and probability intervals in a computing environment may include such operations as analytics, deep learning, and as will be further described, user and device management functions. One of ordinary skill in the art will appreciate that the workloads and functions 96 for automatic reasoning with real-valued first order logic and probability intervals in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
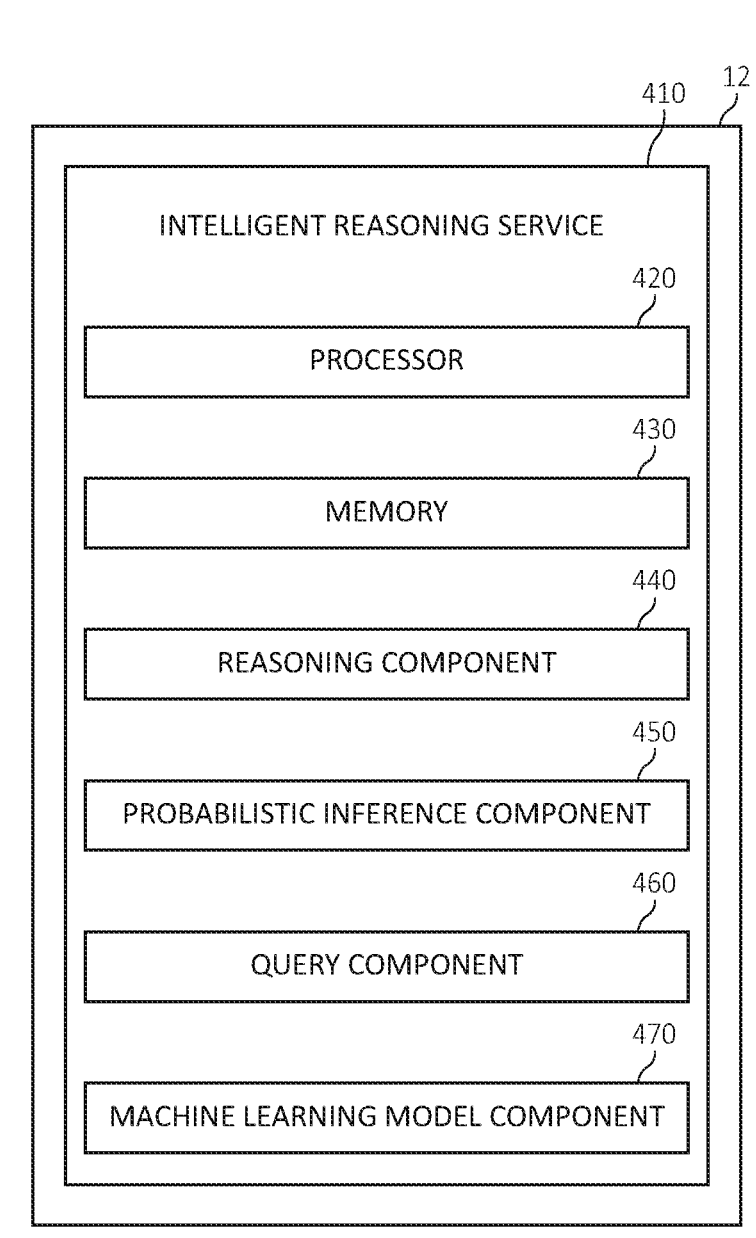
FIG. 4 is an additional block diagram depicting an exemplary functional relationship between various aspects of the present invention.

Turning now to FIG. 4, a block diagram depicting exemplary functional components of system 400 for automatic reasoning with real-valued first order logic and probability intervals in a computing environment (e.g., in a neural network architecture) according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

An intelligent reasoning service 410 is shown, incorporating processing unit 420 ("processor") to perform various computational, data processing and other functionality in accordance with various aspects of the present invention. In one aspect, the processor 420 and memory 430 may be internal and/or external to the intelligent reasoning service 410, and internal and/or external to the computing system/server 12. The intelligent reasoning service 410 may be included and/or external to the computer system/server 12, as described in FIG. 1. The processing unit 420 may be in communication with the memory 430. The intelligent reasoning service 410 may include a reasoning learning component 440, a probabilistic inference component 450, a query component 460, and a machine learning component 470.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

The intelligent reasoning service 410, in association with the reasoning learning component 440, the probabilistic inference component 450, the query component 460, and the machine learning component 470, may convert all first-order logic formulas into real-valued logic formulas; and reason with the real-valued logic formulas and one or more probability intervals associated with an atomic formulae in a knowledge base to provide an interval conditional probability.

Said differently, the intelligent reasoning service 410, in association with the reasoning learning component 440, the probabilistic inference component 450, the query component 460, and the machine learning component 470, may execute machine learning logic to convert all first-order logic formulas into real-valued logic formulas, wherein the real-valued logic formulas are input as training data into a logical neural network ("LNN"); and generate the LNN by using the training data to execute a probabilistic inference using the real-valued logic formulas and one or more probability intervals associated with an atomic formulae in a knowledge base to provide an interval conditional probability indicating that a first predicate condition is true based one or more alternative predicates being true.

The intelligent reasoning service 410, in association with the reasoning learning component 440, the probabilistic inference component 450, the query component 460, and the machine learning component 470, may represent a truth value of each of the real-valued logic formulas as a zero or a one value.

The intelligent reasoning service 410, in association with the reasoning learning component 440, the probabilistic inference component 450, the query component 460, and the machine learning component 470, may receive a set of the first-order logic formulas, and a set of intervals representing upper and lower bounds on one or more truth values of a set of ground predicates from the first-order logic formulas.

The intelligent reasoning service 410, in association with the reasoning learning component 440, the probabilistic inference component 450, the query component 460, and the machine learning component 470, may set upper and lower bounds on one or more truth values of the real-valued logic formulas in a knowledge base.

The intelligent reasoning service 410, in association with the reasoning learning component 440, the probabilistic inference component 450, the query component 460, and the machine learning component 470, may determine a probability of a ground predicate being true based on an alternative ground predicate being true.

The intelligent reasoning service 410, in association with the reasoning learning component 440, the probabilistic inference component 450, the query component 460, and the machine learning component 470, may ground a first-order logic based on a knowledge domain of a plurality of variables; construct a Logical Neural Network (LNN) representation of the grounded first-order logic; and construct a credal network (CN) associated with the LNN.

The intelligent reasoning service 410, in association with the reasoning learning component 440, the probabilistic inference component 450, the query component 460, and the machine learning component 470, may apply a probabilistic inference to determine a set of solutions to one or more queries.

In one aspect, the machine learning component 470 may receive, identify, and/or select a machine learning model and/or machine learning pipeline, a dataset for a data set (e.g., a time series data set) used for testing the machine learning model and/or machine learning pipeline.

In one aspect, the machine learning component 470 as described herein, may perform various machine learning operations using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

Figure 5:
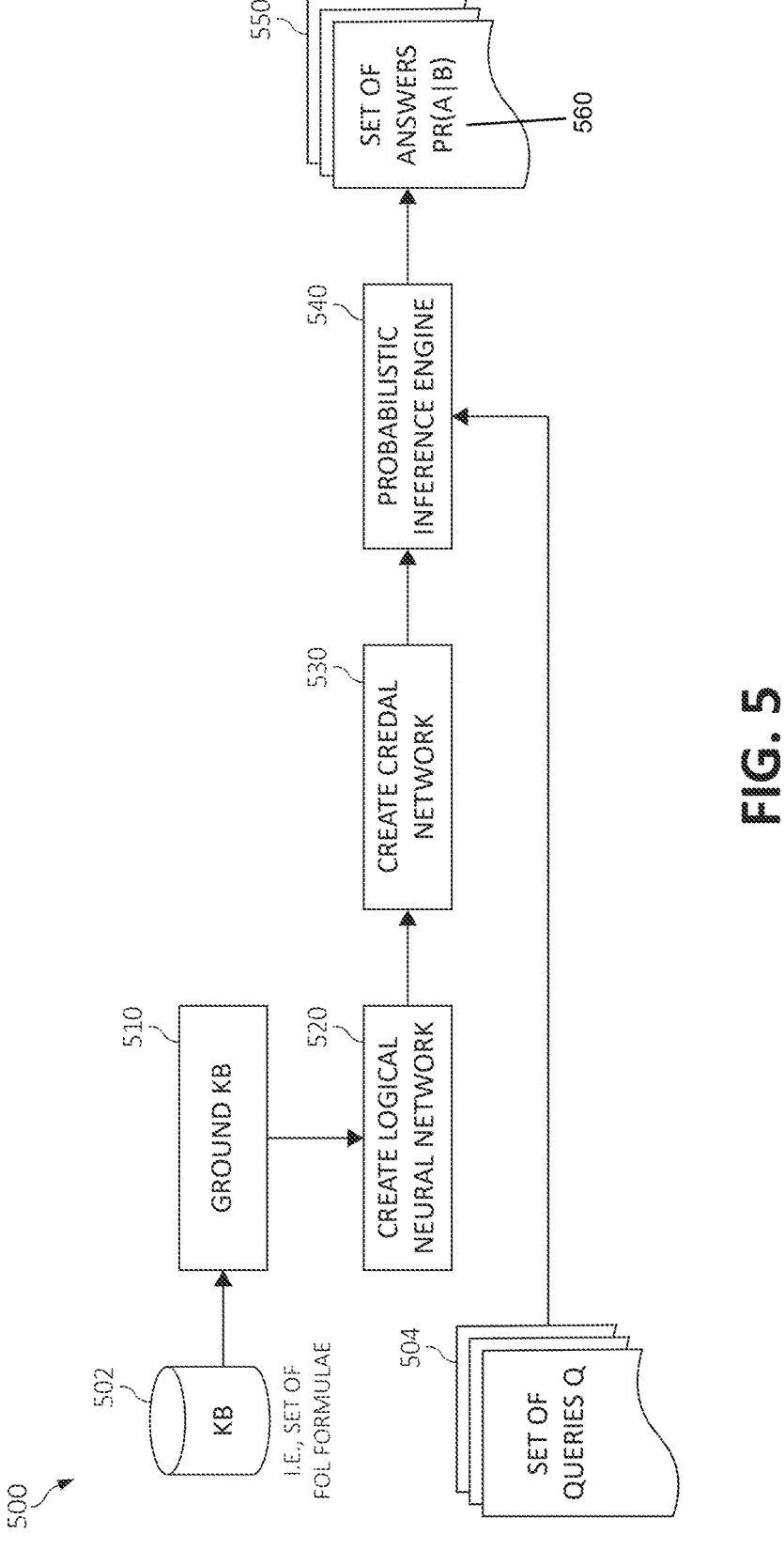
FIG. 5 is a block flow diagram depicting reasoning with real-valued first order logic and probability intervals in a computing environment according to an embodiment of the present invention.

FIG. 5 is a block flow diagram 500 depicting reasoning with real-valued first order logic and probability intervals in a computing environment according to an embodiment of the present invention. In one aspect, one or more of the components, modules, services, applications, and/or functions described in FIGS. 1-4 may be used in FIG. 5. As will be seen, many of the functional blocks may also be considered "modules" or "components" of functionality, in the same descriptive sense as has been previously described in FIGS. 1-4.

Starting in block 502, a knowledge base may contain a set of first-order logic (FOL) formula. In a real world scenario, the knowledge is likely to be noisy, namely the truth value of some formula may be unknown with certainty (for example, when this knowledge is extracted automatically from text sources). That is, a set of FOL formulas ("K"), truth value bounds for one or more ground observations ("O") (i.e., ground predicates from FOL formulas K), a query (e.g., Q(A|B) where A and B are ground predicates in FOL formulas K.

In block 510, a FOL formulas K may be grounded based on a knowledge domain of a plurality of variables. That is, the output of block 510 is a probabilistic inference such as, for example, Pr(A|B). In other words, the interval conditional probability Pr(A|B) is determined/computed, where A and B are set to true. The knowledge base FOL formulas K is grounded into FOL formulas K' by grounding every FOL predicate using the domains of the variables obtained from the ground observations.

In block 520, a Logical Neural Network (LNN) L representation of K' is created. For example, a directed acyclic graph ("DAG") LNN L may be created comprising the syntax trees of the formulae in K'. In one aspect, input truth value bounds may be attached to the nodes in the bottom layer of L (e.g., ground predicates). The truth value bounds for the connector nodes in LNN L (upper layers).

In block 530, a credal network ("CN") C with the same structure as L, where the nodes in LNN L correspond to propositions (e.g., bottom layers) or connectors (e.g., upper layers) and an interval probability tables may be determined for each node.

In block 540, a probabilistic inference engine may determine/compute Pr(A|B) by setting B=true as evidence in C and running a standard probabilistic inference operation for credal network ("CN") C (e.g., the Loopy 2U operation can be used as embodiment). In block 550, a probabilistic inference may return Pr(A|B) for a set of answers 560 based on a set of queries Q had.

This allows the truth value of a formula to be a real number between 0 and 1 instead of just either 0 (false) or 1 (true). In addition, to account for uncertainty in the estimates of the truth values, the upper and lower bounds may be set on the truth values of the formula in the knowledge base. Subsequently, aspects of this disclosure may answer any query of the form $Pr(f(x)|g(y))$ i.e., what is the probability of grounded predicate $f(x)$ being true given that another ground predicate $g(y)$ is true and solving these kinds of queries is translated into probabilistic reasoning over an equivalent credal network. Thus, the credal network 530 can revitalize reasoning under conditions of uncertainty especially in case of imprecise probability estimates as well as real-valued logic operators. The credal network 530 may be applied to other domains that require reasoning over FOL.

For further explanation, assume that we have a knowledge base containing first-order logic (FOL) formulae (e.g., formula). In a real-world situation, this knowledge is likely to be noisy, namely the truth value of some formulae may not be known with certainty (for example, when this knowledge is extracted automatically from text sources). Moreover, reasoning with classical logic formulae is quite brittle. Therefore, aspects of this disclosure converts all first-order logic formulae into real-valued logic formulae (e.g., Lukasiewicz logic). This allows the truth value of a formulae to be a real number between 0 and 1 instead of just either 0 (false) or 1 (true). In addition, to account for uncertainty in the estimates of the truth values, we set upper and lower bounds on the truth values of the formulae in the knowledge base. Subsequently, aspects of this disclosure may answer any query of the form $Pr(f(x)|g(y))$ i.e., what is the probability of grounded predicate $f(x)$ being true given that another ground predicate $g(y)$ is true. Thus, a variety of queries may be solved and then translated into probabilistic reasoning over an equivalent credal network.

To further illustrate, assume there is text data containing the following pieces of knowledge: (1) Smoking("Sm") causes cancer ("Ca") (e.g., Sm(x)→Ca(x)). If two people (e.g., "x, y") are friends ("Fr"), then either or both are smoking; and (2) A and B are friends ("Fr"), B and C are friends and B smokes. Thus, aspects of this disclosure may formalize this knowledge by automatically extracting the following FOL formulae: (a) allow probability upper/lower bounds on observation predicates (2) as depicted in FIG. 6A, and (b) use real-valued logical connectors in FOL formulae (1) as illustrated below and in as depicted in FIG. 6A:

$$\begin{cases} Sm(x) \to Ca(x) \\ Fr(x, y) \to (sm(x) \oplus Sm(y)) \end{cases} \tag{1}$$

For further explanation, FIG. 6A is a diagram 600 depicting a logical neural network (LNN) associated with the grounded formulas in a computing environment in which aspects of the present invention may be realized. In one aspect, one or more of the components, modules, services, applications, and/or functions described in FIGS. 1-5 may be used in FIG. 6A. As will be seen, many of the functional blocks may also be considered "modules" or "components" of functionality, in the same descriptive sense as has been previously described in FIGS. 1-5.

In one aspect, the logical neural network (LNN) 600 a directed acyclic graph 603, where the square nodes (e.g., nodes having shapes) correspond to the grounded predicates and the internal nodes correspond to the logical connectors in the formulas. These logical connectors are real-valued logical connectors and their associated rules are given above the graph. For example, the symbol (e.g., →) is the real-valued implication connector, and the circled plus sign (e.g., "+") is the real-valued or connector.

In some implementation, the real-valued implication connector may be a real-valued connector defined by the Lukasiewicz real-valued logic. The square nodes are associated with lower and upper bounds on their truth values and the logical connectors compute lower and upper bounds on the truth values of the corresponding formulas.

Moreover, given the formal knowledge base, a query necessary to answer may be a query such as, for example: ("what is the probability that C has cancer given that A is a smoker?") and furthermore, the current board HOA's to bound the truth value instead of giving point estimates such as, for example, example 1:

$$P(Ca(C)|Sm(A)) \in [l,u] \tag{1}$$

where, Ca represents a disease (e.g., cancer and (C) is a person has the disease, Sm represents a predicate engages in an activity (e.g., smoking(A) where A is a person doing the activity), and in this scenario, aspects of this disclosure determine/calculate the probability that person (C) given that person (A) is a smoker (e.g., P(Ca(C)|Sm(A))). Thus, aspects of this disclosure compute a probability interval [l, u] for P(Ca(C)|Sm(A)).

Thus, aspects of this disclosure first grounds the FOL given the domains of the variables (observations), constructs a Logical Neural Network ("LNN") representation of the ground FOL, constructs an equivalent credal network (CN), and subsequently answers the query by means of probabilistic inference in the CN (e.g., using the Loopy 2U ("L2U") belief propagation algorithm).

For further explanation, FIG. 6B is a diagram 615 depicting a logical neural network (LNN) associated with propositional formulas (e.g., "formulae") in a computing environment, in which aspects of the present invention may be realized. In one aspect, one or more of the components, modules, services, applications, and/or functions described in FIGS. 1-6A may be used in FIG. 6B. As will be seen, many of the functional blocks may also be considered "modules" or "components" of functionality, in the same descriptive sense as has been previously described in FIGS. 1-6A.

That is, FIG. 6B depicts a logical neural network (LNN) 605 (e.g., associated with the propositional formulas on the left-hand side of the slide. All leaf nodes (i.e., the propositional variables in the formulae) have bounds on their truth values. Similarly, aspects of this disclosure may compute the bounds on the truth values of the connector nodes (the circles). That is, for example, for node f1: the truth value of formula f1 is between 0.6 and 1.0.

Figure 6C:
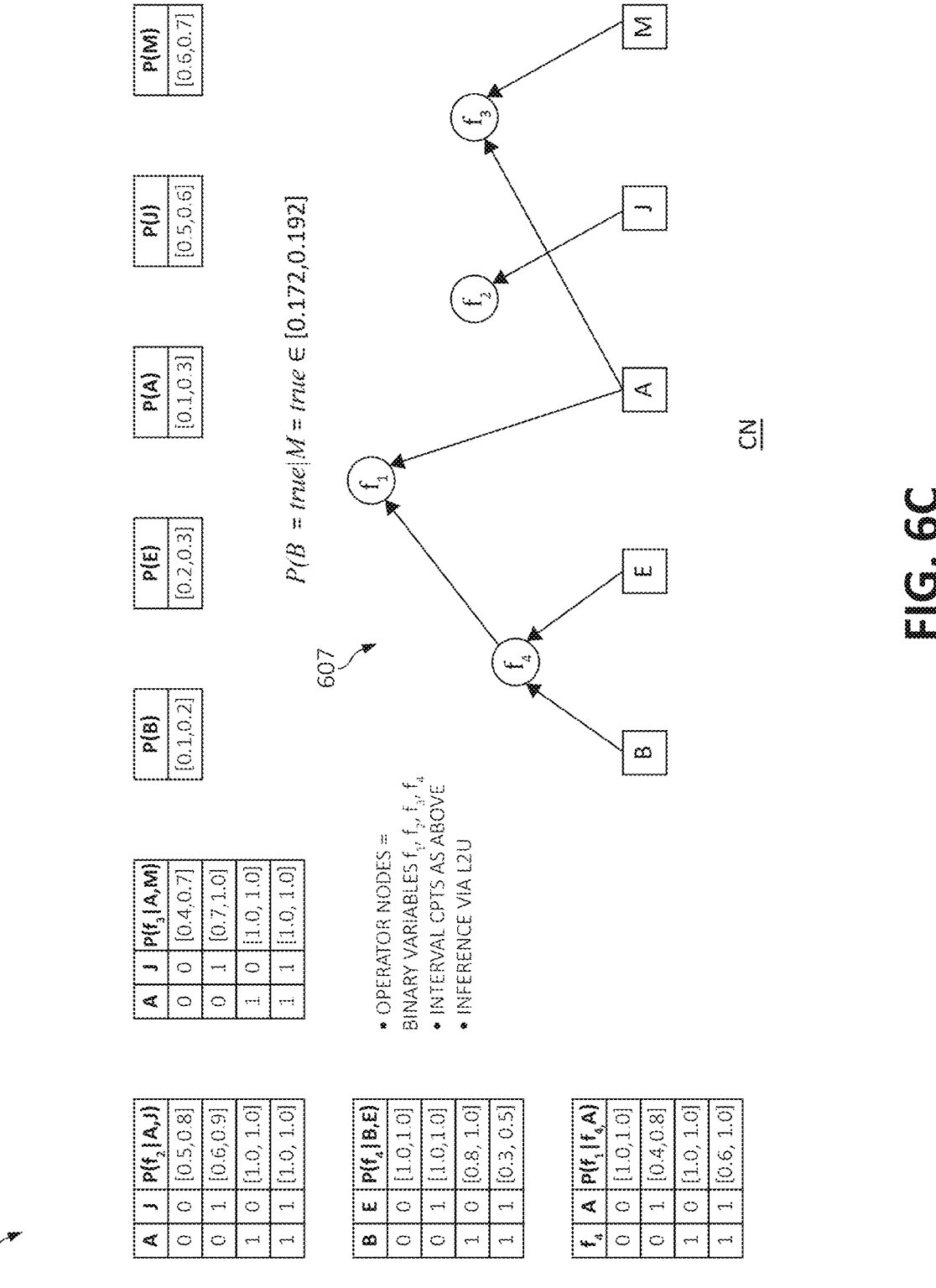
FIG. 6C is a diagram depicting a credal network corresponding to a logical neural network (LNN) in a computing environment, by a processor, in which aspects of the present invention may be realized.

Turning now to FIG. 6C, diagram 625 depicts a credal network corresponding to a logical neural network (LNN) in a computing environment, by a processor, in which aspects of the present invention may be realized. In one aspect, one or more of the components, modules, services, applications, and/or functions described in FIGS. 1-6B may be used in FIG. 6A. As will be seen, many of the functional blocks may also be considered "modules" or "components" of functionality, in the same descriptive sense as has been previously described in FIGS. 1-6B.

The credal network (CN) 607 corresponding to the LNN 605 in FIG. 6B. The credal network 607 has exactly the same structure as the LNN 605. A credal network 607 is defined by a directed acyclic graph (e.g., DAG 603) whose nodes represent a set of binary variables. In our case, the squared nodes correspond to the propositional variables in the logic formulas, and the circled nodes correspond to formulas or sub-formulas defined over the propositional variables. Each node in the CN 607 is associated with a credal set (e.g., the tables around the CN 607). For example, looking at node f2, the credal set P(f2|A, J) gives lower and upper bounds on the probability that f2 is true given all possible combinations of truth values of A and J. The table has 4 rows because there are 4 possible combinations of truth values for A and J (where 0 represents/stands for false and 1 represents/stands for true).

Figure 7:
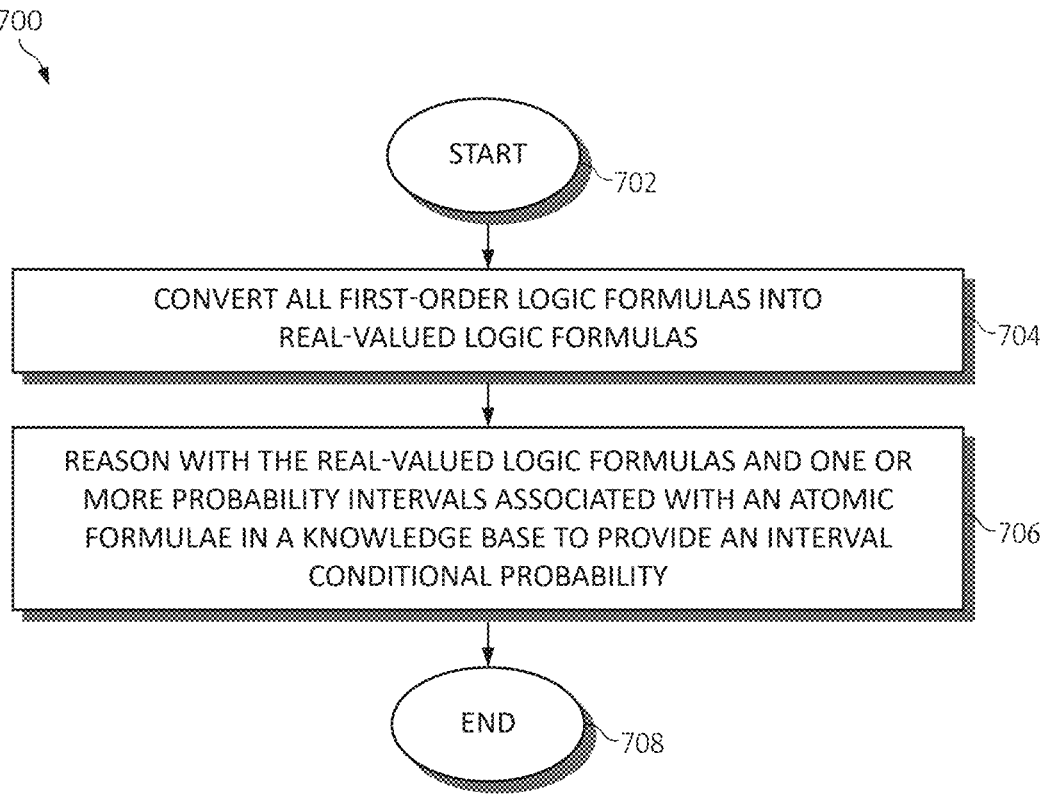
FIG. 7 is flowchart diagram depicting an exemplary method for providing reasoning with real-valued first order logic and probability intervals in a computing environment, by a processor, in which aspects of the present invention may be realized.

Turning now to FIG. 7, a method 700 for providing reasoning with real-valued first order logic and probability intervals in a computing environment using a processor is depicted, in which various aspects of the illustrated embodiments may be implemented. The functionality 700 may be implemented as a method (e.g., a computer-implemented method) executed as instructions on a machine, where the instructions are included on at least one computer readable medium or one non-transitory machine-readable storage medium. The functionality 700 may start in block 702.

All first-order logic formulas may be converted into real-valued logic formulas, as in block 704. The real-valued logic formulas and one or more probability intervals associated with an atomic formula in a knowledge base may be reasoned to provide an interval conditional probability, as in block 706. The functionality 700 may end, as in block 708.

In one aspect, in conjunction with and/or as part of at least one blocks of FIG. 7, the operations of method 700 may include each of the following. The operations of 700 may execute machine learning logic to convert all first-order logic formulas into real-valued logic formulas, wherein the real-valued logic formulas are input as training data into a logical neural network ("LNN"); and generate the LNN by using the training data to execute a probabilistic inference using the real-valued logic formulas and one or more probability intervals associated with an atomic formulae in a knowledge base to provide an interval conditional probability indicating that a first predicate condition is true based one or more alternative predicates being true.

The operations of 700 may represent a truth value of each of the real-valued logic formulas as a zero or a one value. The operations of 700 may receive a set of the first-order logic formulas, a set of intervals representing upper and lower bounds on one or more truth values of a set of ground predicates from the first-order logic formulas. The operations of 700 may set upper and lower bounds on one or more truth values of the real-valued logic formulas in a knowledge base.

The operations of 700 may determine a probability of a ground predicate being true based on an alternative ground predicate being true. The operations of 700 may ground a first-order logic based on a knowledge domain of a plurality of variables; construct a Logical Neural Network (LNN) representation of the grounded first-order logic; and construct a credal network (CN) associated with the LNN. The operations of 700 may apply a probabilistic inference to determine a set of solutions to one or more queries.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing enhanced automated reasoning in a computing environment by one or more processors comprising:

executing machine learning logic to convert a set of first-order logic statements into a set of real-valued logic representations, wherein the set of real-valued logic representations are input as training data into a logical neural network ("LNN"); and generating the LNN by using the training data, wherein the LNN is configured to execute a probabilistic inference using the set of real-valued logic representations and one or more probability intervals associated with an atomic statement in a knowledge base to provide an interval conditional probability indicating that a first predicate condition is true based one or more alternative predicates being true, wherein the probabilistic inference comprises performing iterative message passing across nodes of a credal network representation of the LNN to update lower and upper probability bounds at the nodes, and terminating the iterative message passing responsive to detecting a convergence condition or expiration of a time limit.

2. The method of claim 1, further including representing a truth value of each of the set of real-valued logic representations as a zero or a one value.

3. The method of claim 1, further including receiving the set of first-order logic statements, and a set of intervals representing upper and lower bounds on one or more truth values of a set of ground predicates from the set of first-order logic statements.

4. The method of claim 1, further including setting upper and lower bounds on one or more truth values of the set of real-valued logic representations in the knowledge base.

5. The method of claim 1, further including determining a probability of a ground predicate being true based on an alternative ground predicate being true.

6. The method of claim 1, further including:

grounding a first-order logic based on a knowledge domain of a plurality of variables, wherein the LNN is a representation of the grounded first-order logic; and constructing the credal network representation associated with the LNN.

7. The method of claim 1, further including applying the probabilistic inference to determine a set of solutions to one or more queries.

8. A system for providing enhanced automated reasoning in a computing environment, comprising:

one or more computers with executable instructions that when executed cause the system to:

execute machine learning logic to convert a set of first-order logic statements into a set of real-valued logic representations, wherein the set of real-valued logic representations are input as training data into a logical neural network ("LNN"); and generate the LNN by using the training data, wherein the LNN is configured to execute a probabilistic inference using the set of real-valued logic representations and one or more probability intervals associated with an atomic statement in a knowledge base to provide an interval conditional probability indicating that a first predicate condition is true based one or more alternative predicates being true, wherein the probabilistic inference comprises performing iterative message passing across nodes of a credal network representation of the LNN to update lower and upper probability bounds at the nodes, and terminating the iterative message passing responsive to detecting a convergence condition or expiration of a time limit.

9. The system of claim 8, wherein the executable instructions when executed cause the system to represent a truth value of each of the set of real-valued logic representations as a zero or a one value.

10. The system of claim 8, wherein the executable instructions when executed cause the system to receive the set of first-order logic statements, and a set of intervals representing upper and lower bounds on one or more truth values of a set of ground predicates from the set of first-order logic statements.

11. The system of claim 8, wherein the executable instructions when executed cause the system to set upper and lower bounds on one or more truth values of the set of real-valued logic representations in the knowledge base.

12. The system of claim 8, wherein the executable instructions when executed cause the system to determine a probability of a ground predicate being true based on an alternative ground predicate being true.

13. The system of claim 8, wherein the executable instructions when executed cause the system to:

ground a first-order logic based on a knowledge domain of a plurality of variables, wherein the LNN is a representation of the grounded first-order logic; and construct the credal network representation associated with the LNN.

14. The system of claim 8, wherein the executable instructions when executed cause the system to apply the probabilistic inference to determine a set of solutions to one or more queries.

15. A computer program product for providing enhanced automated reasoning in a computing environment, the computer program product comprising:

one or more computer readable storage media, and program instructions collectively stored on the one or more computer readable storage media, the program instruction comprising:

program instructions to execute machine learning logic to convert a set of first-order logic statements into a set of real-valued logic representations, wherein the set of real-valued logic representations are input as training data into a logical neural network ("LNN"); and program instructions to generate the LNN by using the training data, wherein the LNN is configured to execute a probabilistic inference using the set of real-valued logic representations and one or more probability intervals associated with an atomic statement in a knowledge base to provide an interval conditional probability indicating that a first predicate condition is true based one or more alternative predicates being true, wherein the probabilistic inference comprises performing iterative message passing across nodes of a credal network representation of the LNN to update lower and upper probability bounds at the nodes, and terminating the iterative message passing responsive to detecting a convergence condition or expiration of a time limit.

16. The computer program product of claim 15, further including program instructions to represent a truth value of each of the set of real-valued logic representations as a zero or a one value.

17. The computer program product of claim 15, further including program instructions to receive the set of first-order logic statements, and a set of intervals representing upper and lower bounds on one or more truth values of a set of ground predicates from the set of first-order logic statements.

18. The computer program product of claim 15, further including program instructions to set upper and lower bounds on one or more truth values of the set of real-valued logic representations in the knowledge base.

19. The computer program product of claim 15, further including program instructions to determine a probability of a ground predicate being true based on an alternative ground predicate being true.

20. The computer program product of claim 15, further including program instructions to:

ground a first-order logic based on a knowledge domain of a plurality of variables, wherein the LNN is a representation of the grounded first-order logic; and construct the credal network representation associated with the LNN.

* * * * *